US008818417B2

(12) United States Patent
Powell (10) Patent No.: US 8,818,417 B2
(45) Date of Patent: Aug. 26, 2014

(54) METHOD FOR WIRELESS DEVICE LOCATION USING AUTOMATIC LOCATION UPDATE VIA A PROVISIONING DEVICE AND RELATED APPARATUS AND SYSTEM

(75) Inventor: Robert Powell, Furlong, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/272,728

(22) Filed: Oct. 13, 2011

(65) Prior Publication Data

US 2013/0095847 A1    Apr. 18, 2013

(51) Int. Cl.
*H04W 4/00*    (2009.01)

(52) U.S. Cl.
USPC ......... 455/456.5; 455/434; 455/521; 455/403

(58) Field of Classification Search
USPC ............... 455/456, 456.5, 521, 422, 403; 340/539.13, 539.1, 539.11; 709/242, 709/243; 703/242, 243
See application file for complete search history.

(56) References Cited

U.S. PATENT DOCUMENTS

| 5,027,288 | A | 6/1991 | Suzuki et al. |
| 5,361,336 | A | 11/1994 | Atchison |
| 5,903,455 | A | 5/1999 | Sharpe, Jr. et al. |
| 6,463,290 | B1 | 10/2002 | Stilp et al. |
| 6,603,977 | B1 * | 8/2003 | Walsh et al. ............... 455/456.1 |
| 6,782,264 | B2 | 8/2004 | Anderson |
| 7,090,683 | B2 | 8/2006 | Brock et al. |
| 7,167,713 | B2 | 1/2007 | Anderson |
| 7,209,727 | B2 | 4/2007 | Castaneda et al. |
| 7,214,230 | B2 | 5/2007 | Brock et al. |
| 7,371,210 | B2 | 5/2008 | Brock et al. |
| 7,546,125 | B2 | 6/2009 | Sharma et al. |
| 7,567,785 | B2 | 7/2009 | Tsai et al. |
| 7,570,922 | B2 | 8/2009 | Williams |
| 7,654,957 | B2 | 2/2010 | Abreu |
| 7,656,271 | B2 | 2/2010 | Ehrman et al. |
| 7,688,820 | B2 | 3/2010 | Forte et al. |
| 7,701,913 | B2 | 4/2010 | Chen et al. |
| 7,760,905 | B2 | 7/2010 | Rhoads et al. |
| 7,819,859 | B2 | 10/2010 | Prisco et al. |

(Continued)

FOREIGN PATENT DOCUMENTS

| KR | 1020050077105 A | 8/2005 | |
| KR | 1020090010515 A | 1/2009 | |
| WO | WO2009154599 | * 12/2009 | ............... G08G 1/14 |
| WO | WO20090154599 | * 12/2009 | ............... G08G 1/14 |

OTHER PUBLICATIONS

Golatowski et al. (Service Oriented Software Architecture of Sensor Networks—2003).*

(Continued)

*Primary Examiner* — Manpreet Matharu (57) ABSTRACT

A method includes identifying a location of a provisioning device at the provisioning device. The method also includes providing data from the provisioning device to a field device in an industrial control system in order to provision the field device. The method further includes communicating the identified location to the field device for storage. In addition, the method includes storing the identified location in association with information identifying the field device at the provisioning device. The location of the provisioning device could represent GPS coordinates of the provisioning device. Also, the data and the identified location can be provided to the field device through an out-of-band communication interface, such as a direct wired interface and an infrared interface.

20 Claims, 4 Drawing Sheets

(56) References Cited

U.S. PATENT DOCUMENTS

| | | |
|---|---|---|
| 7,852,271 B2 | 12/2010 | Grunig et al. |
| 7,965,664 B2 | 6/2011 | Hodson et al. |
| 7,978,062 B2 | 7/2011 | LaLonde et al. |
| 8,112,565 B2 | 2/2012 | Russell, III et al. |
| 8,229,576 B2 | 7/2012 | Kodama et al. |
| 8,307,125 B2 | 11/2012 | Kodama |
| 8,379,546 B2 | 2/2013 | Schleiss et al. |
| 8,390,150 B2 | 3/2013 | Vande Vusse et al. |
| 2001/0038451 A1 | 11/2001 | Jung et al. |
| 2001/0038453 A1 | 11/2001 | Jung et al. |
| 2005/0125085 A1 | 6/2005 | Prasad et al. |
| 2005/0206562 A1* | 9/2005 | Willson et al. ............ 342/357.07 |
| 2006/0036714 A1 | 2/2006 | Vuontisjarvi et al. |
| 2006/0238159 A1 | 10/2006 | Jung |
| 2006/0276143 A1 | 12/2006 | Anglin |
| 2007/0103324 A1 | 5/2007 | Kosuge et al. |
| 2007/0123249 A1 | 5/2007 | Sun |
| 2007/0126576 A1 | 6/2007 | Script et al. |
| 2008/0094631 A1 | 4/2008 | Jung et al. |
| 2008/0155064 A1 | 6/2008 | Kosuge et al. |
| 2008/0274766 A1 | 11/2008 | Pratt et al. |
| 2009/0010203 A1 | 1/2009 | Pratt, Jr. et al. |
| 2009/0010233 A1 | 1/2009 | Pratt, Jr. et al. |
| 2009/0073423 A1 | 3/2009 | Jung et al. |
| 2009/0311975 A1 | 12/2009 | Vanderaa et al. |
| 2010/0036511 A1* | 2/2010 | Dongare ........................ 700/83 |
| 2010/0290351 A1 | 11/2010 | Toepke et al. |
| 2011/0068906 A1 | 3/2011 | Shafer et al. |
| 2011/0187490 A1 | 8/2011 | Nakamoto et al. |
| 2011/0228725 A1 | 9/2011 | Nakamoto et al. |
| 2012/0041744 A1 | 2/2012 | Kantzes et al. |
| 2012/0084400 A1 | 4/2012 | Almadi et al. |
| 2012/0230446 A1 | 9/2012 | Feng |
| 2012/0236768 A1 | 9/2012 | Kolavennu et al. |
| 2012/0316686 A1 | 12/2012 | Dueckman |

OTHER PUBLICATIONS

3M Electronic Marker System (EMS) Ball Markers, Product information by 3M retrieved Nov. 30, 2013 from online http://multimedia.3m.com/mws/mediawebserver?mwsId=66666UgxGCuNyXTtN8TaIXTtEVtQEcuZgVs6EVs6E666666--.*

"ISA100 Wireless Module", www.wihartsystems.com, retrieved from the internet on Jun. 15, 2012, 3 pages.

Derek Benz, "Industrial Wireless: Implementation Success Factors", Control Engineering Asia, Apr. 2009, 12 pages.

"UDC3500 Universal Digital Controller", Honeywell Process Solutions, Mar. 2007, 16 pages.

"Honeywell Announces New Infrared Technology Designed to Help Contractors Save Time and Money", News Release, AutomatedBuildings.com, Mar. 2006, 2 pages.

Frank Golatowski, et al., "Service-Oriented Software Architecture for Sensor Networks", 2003, 3 pages.

Notification of Transmittal of the International Search Report and the Written Opinion of the International Searching Authority, or the Declaration dated Apr. 27, 2012 in connection with International Patent Application No. PCT/US2012/029338.

Notification of Transmittal of the International Search Report and the Written Opinion of the International Searching Authority, or the Declaration dated Mar. 19, 2013 in connection with International Patent Application No. PCT/US2012/058620.

Office Action dated May 31, 2013 in connection with U.S. Appl. No. 13/331,638, 22 pages.

\* cited by examiner

METHOD FOR WIRELESS DEVICE LOCATION USING AUTOMATIC LOCATION UPDATE VIA A PROVISIONING DEVICE AND RELATED APPARATUS AND SYSTEM

TECHNICAL FIELD

This disclosure relates generally to industrial control and automation systems. More specifically, this disclosure relates to a method for wireless device location using automatic location update via a provisioning device and related apparatus and system.

BACKGROUND

Industrial control and automation systems are often used to automate large and complex industrial processes. These types of systems routinely include wireless networks that facilitate communications with a wide range of industrial field devices. The field devices can include wireless sensors, wireless actuators, and wireless controllers.

After a wireless field device is deployed, a user may need to identify where the field device is located for service, recovery, or replacement. However, locating a wireless field device can be challenging since there are no physical wires that can be traced to find the field device.

Locating a wireless field device is typically accomplished via triangulation. In this approach, neighboring wireless nodes near the field device measure the strengths or directions of wireless signals received from the field device. The locations of the neighboring nodes and the received signal strengths or directions are then used to estimate the field device's location. Unfortunately, this approach may be impractical in various circumstances. For instance, the number of reachable neighboring nodes may be too small to permit triangulation of the field device's location. Also, the estimated location may not be accurate enough to actually locate the field device, such as in a complex facility. In addition, this approach cannot be used if the field device is unable to transmit wireless signals (such as due to a failed power supply).

SUMMARY

This disclosure provides a method for wireless device location using automatic location update via a provisioning device and related apparatus and system.

In a first embodiment, a method includes identifying a location of a provisioning device at the provisioning device. The method also includes providing data from the provisioning device to a field device in an industrial control system in order to provision the field device. The method further includes communicating the identified location to the field device for storage. In addition, the method includes storing the identified location in association with information identifying the field device at the provisioning device.

In a second embodiment, an apparatus includes an interface configured to communicate with a field device in an industrial control system and a location detector configured to identify a location of the apparatus. The apparatus also includes a controller configured to (i) initiate communication of data to the field device via the interface in order to provision the field device and (ii) initiate communication of the identified location to the field device via the interface. The apparatus further includes a memory configured to store the identified location in association with information identifying the field device.

In a third embodiment, a system includes a field device in an industrial control system and a provisioning device configured to provision the field device. The provisioning device includes an interface configured to communicate with the field device and a location detector configured to identify a location of the provisioning device. The provisioning device also includes a controller configured to (i) initiate communication of data to the field device via the interface in order to provision the field device and (ii) initiate communication of the identified location to the field device via the interface. The provisioning device further includes a memory configured to store the identified location in association with information identifying the field device at the provisioning device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
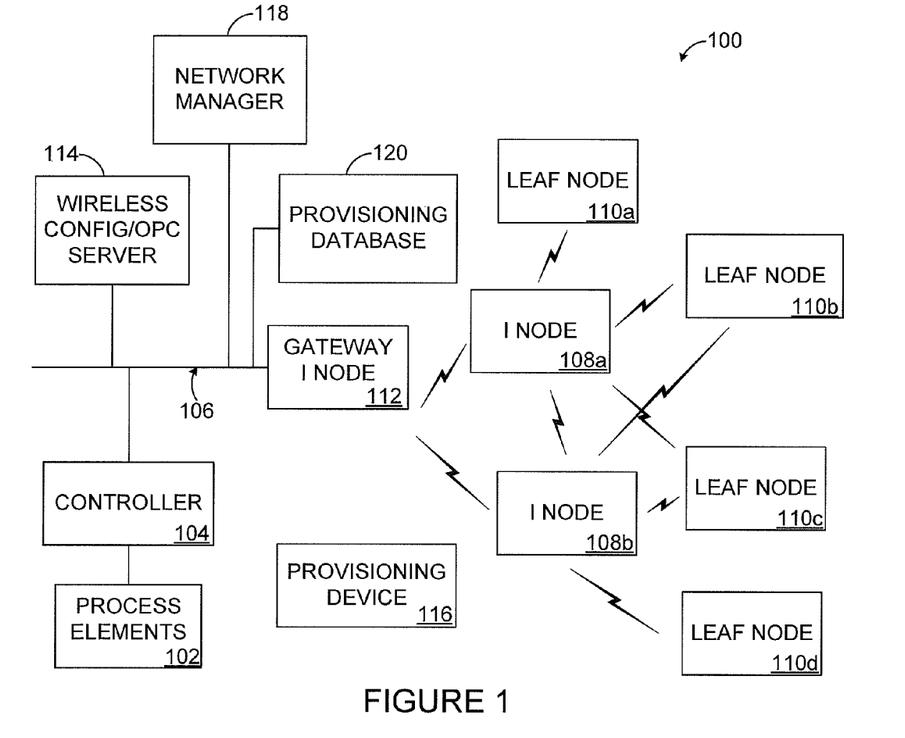
FIG. 1 illustrates an example industrial control and automation system according to this disclosure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any suitable structure for controlling one or more process elements 102. The controller 104 could, for example, represent a computing device executing multi-variable or other control logic.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

In FIG. 1, the system 100 also includes one or more industrial wireless networks for communicating with wireless sensors or other wireless field devices. In this example, a wireless network includes infrastructure nodes ("I nodes") 108a-108b, leaf nodes 110a-110d, and gateway infrastructure nodes 112.

The infrastructure nodes 108a-108b and the leaf nodes 110a-110d engage in wireless communications with each other. For example, the infrastructure nodes 108a-108b may receive data transmitted over the network 106 (via a gateway infrastructure node 112) and wirelessly communicate the data to the leaf nodes 110a-110d. Also, the leaf nodes 110a-110d may wirelessly communicate data to the infrastructure nodes 108a-108b for forwarding to the network 106 (via a gateway infrastructure node 112). In addition, the infrastructure nodes 108a-108b may wirelessly exchange data with one another. In this way, the nodes 108a-108b, 112 (and optionally the nodes 110a-110d) form a wireless network capable of providing wireless coverage to leaf nodes and other devices in a specified area, such as a large industrial complex.

In this example, the nodes 108a-108b and 110a-110d are divided into infrastructure nodes and leaf nodes. The infrastructure nodes 108a-108b typically represent routing devices that can store and forward messages for other devices. Infrastructure nodes 108a-108b are typically line-powered devices, meaning these nodes receive operating power from an external source. Infrastructure nodes 108a-108b are typically not limited in their operations since they need not minimize power consumption to increase the operational life of their internal power supplies. On the other hand, the leaf nodes 110a-110d are generally non-routing devices that do not store and forward messages for other devices (although they could). Leaf nodes 110a-110d typically represent devices powered by local power supplies, such as nodes that receive operating power from internal batteries or other internal power supplies. Leaf nodes 110a-110d are often more limited in their operations in order to help preserve the operational life of their power supplies.

The nodes 108a-108b and 110a-110d include any suitable structures facilitating wireless communications, such as radio frequency (RF) frequency-hopping spread spectrum (FHSS) or direct sequence spread spectrum (DSSS) transceivers. The nodes 108a-108b and 110a-110d could also include other functionality, such as functionality for generating or using data communicated over the wireless network. For example, the leaf nodes 110a-110d could include wireless sensors used to measure various characteristics within an industrial facility. The sensors could collect and communicate sensor readings to the controller 104 via the wireless network. The leaf nodes 110a-110d could also include wireless actuators that receive control signals from the controller 104 and that adjust the operation of the industrial facility. In this way, the leaf nodes may include or operate in a similar manner as the process elements 102 physically connected to the controller 104. The leaf nodes 110a-110d could further include handheld user devices (such as INTELATRAC devices from HONEYWELL INTERNATIONAL INC.), mobile stations, programmable logic controllers, process controllers, or any other or additional devices. The infrastructure nodes 108a-108b, 112 may also include any of the functionality of the leaf nodes 110a-110d or the controller 104.

The gateway infrastructure node 112 communicates wirelessly with, transmits data to, and receives data from one or more infrastructure nodes and possibly one or more leaf nodes. The gateway infrastructure node 112 also converts data between protocol(s) used by the network 106 and protocol(s) used by the nodes 108a-108b and 110a-110d. For example, the gateway infrastructure node 112 could convert Ethernet-formatted data transported over the network 106 into a wireless protocol format (such as an IEEE 802.11a, 802.11b, 802.11g, 802.11n, 802.15.3, 802.15.4, or 802.16 format or an ISA100.11a format) used by the nodes 108a-108b and 110a-110d. The gateway infrastructure node 112 could also convert data received from one or more of the nodes 108a-108b and 110a-110d into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In particular embodiments, various wireless nodes 108a-108b, 112 (and possibly nodes 110a-110d) in the wireless network of FIG. 1 form a mesh network communicating at 2.4 GHz or 5.8 GHz. Also, in particular embodiments, data can be injected into the wireless mesh network through the infrastructure nodes or leaf nodes. This can therefore provide versatile, multifunctional, plant-wide coverage for wireless sensing, asset location tracking, personnel tracking, wireless communications, and any other or additional functionality as desired.

A wireless configuration and OLE for Process Control (OPC) server 114 can configure and control various aspects of the system 100. For example, the server 114 could configure the operation of the nodes 108a-108b, 110a-110d, and 112. The server 114 could also support security in the system 100, such as by distributing cryptographic keys or other security data to various components in the system 100 (like to the nodes 108a-108b, 110a-110d, and 112). The server 114 includes any suitable structure for configuring wireless networks and providing security information.

In one aspect of operation, one or more provisioning devices 116 are used to provision components of the system 100. For example, a provisioning device 116 can be used when personnel are installing a field device (a process element 102, a controller 104, a node 108a-108b, 110a-110d, 112, or other component in the system 100). Among other things, the provisioning device 116 can be used to configure the field device being installed. In general, provisioning involves setting up a component by establishing certain parameters or settings for the component (typically during or after installation of the component within a system). As an example, provisioning a wireless field device can include providing the wireless field device with information about a wireless network, such as the wireless network's identifier or security credentials. This could be accomplished in any suitable manner, such as by using infrared or wired communications between the provisioning device 116 and the field device. In this way, necessary information can be provided to the field device in a secure manner.

As noted above, it can sometimes be difficult to accurately determine the location of a field device after installation within a system, such as a wireless field device in a complex system. In accordance with this disclosure, the provisioning device 116 includes a mechanism for identifying its location. Any suitable location identification technique could be used, such as GPS, high-accuracy triangulation, or other technique. During provisioning of a field device, the provisioning device 116 can identify its location while near the field device, allowing the provisioning device 116 to effectively identify the location of the field device. The provisioning device 116 can then provide that location to the field device itself, such as by writing that location into a non-volatile memory of the field device. The location can have any suitable format, such as GPS coordinates. At a later time, the location of the field device can be retrieved from the field device remotely, such as by requesting that the field device provide its location via a location attribute.

The provisioning device 116 can also store within its own memory the identified location in association with data identifying the field device. The provisioning device 116 can then provide that information to an external destination, such as a network manager 118 or a provisioning database 120. The network manager 118 or provisioning database 120 may then use the information in any suitable manner. For instance, if the field device later fails and cannot transmit its own location, the location of the field device can be retrieved from the network manager 118 or provisioning database 120.

In this way, the field device itself does not require additional capability to obtain its location, which helps to reduce the complexity and cost of the field device. Instead, the GPS or other location-identification capabilities of the provisioning device 116 are used, and the identified location can be made available to any number of external destinations. Further, since the location information can be preserved in the field device, the network manager 118, and/or the provisioning database 120, the field device's provisioned location is available even when wireless communication with the field device fails. In addition, since the location information (like GPS coordinates) can be more accurate than other methods, it may be more useful to field personnel, such as when field devices are mounted close together. Note that while the identified location is described as being stored at multiple destinations (the field device, the provisioning device, the network manager, and the provisioning database), the identified location could be stored at any number of locations (including a single location).

Each provisioning device 116 includes any suitable structure for identifying its location and provisioning a field device. In some embodiments, a provisioning device 116 represents a mobile computing device, such as a personal digital assistant (PDA), mobile telephone, or other device. In particular embodiments, the location of a field device can be determined and provided to the field device or other destination during provisioning of the field device onto a wireless network.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated as being used along with a wired controller 104 and wired process elements 102, the provisioning device 116 could be used with just wireless components or just wired components. In addition, FIG. 1 illustrates one example operational environment where a location-sensing provisioning device 116 can be used. This functionality could be used in any other suitable system.

Figure 2:
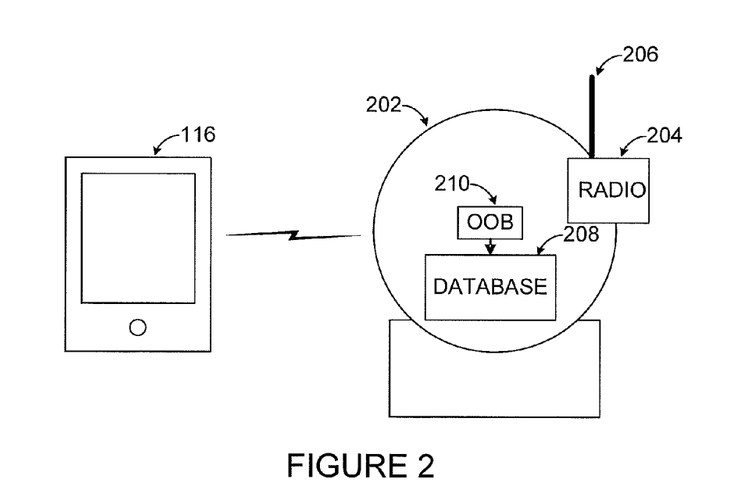
FIG. 2 illustrates additional details of an example field device and an example provisioning device in an industrial control and automation system according to this disclosure.

FIG. 2 illustrates additional details of an example field device and an example provisioning device 116 in an industrial control and automation system 100 according to this disclosure. In this example, the provisioning device 116 interacts with a generic wireless field device 202. The field device 202 could represent any suitable wireless field device, such as a wireless infrastructure node or leaf node. In particular embodiments, the field device 202 could represent a wireless sensor, a wireless actuator, or a wireless controller. Of course, the provisioning device 116 could also interact with a wired field device.

As shown in FIG. 2, the provisioning device 116 represents a personal digital assistant, mobile telephone, or other device having a touchscreen interface. However, the provisioning device 116 could have any other suitable form factor and may or may not support voice communications or other functions unrelated to provisioning. The provisioning device 116 also includes location-identification functionality that identifies the current location of the provisioning device 116.

The field device 202 here includes at least one wireless radio 204 supporting wireless communications. Note that any suitable wireless protocol(s) could be supported by the wireless radio 204. Also, the wireless radio 204 could communicate via a single antenna 206 or multiple antennas 206. The field device 202 also includes a database 208, which stores various information used, generated, or collected by the field device 202. The database 208 could be stored in any suitable volatile and/or non-volatile storage and retrieval device(s). In addition, the field device 202 includes an out-of-band (OOB) communication interface 210 that allows the field device 202 to interact with the provisioning device 116. When the wireless radio 204 communicates with an external wireless system using the appropriate protocol(s) and security credentials, these communications are referred to as "in-band" communications. Communications with the provisioning device 116 may not occur through the wireless radio 204 but via some other mechanism, and these communications are referred to as "out-of-band" communications. In some embodiments, the wireless radio 204 supports an industrial wireless standard (such as the ISA100.11a protocol), and the provisioning device 116 communicates with the field device 202 using out-of-band communications (such as infrared or direct wired communications). The interface 210 includes any suitable structure supporting out-of-band communications.

In one aspect of operation, the provisioning device 116 identifies its location using any suitable technique. That location can be sent to the field device 202 during provisioning, possibly along with other information (such as a wireless network identifier, wireless security information, or other provisioning information). The field device 202 can store the location in its local database 208 so that it can later transmit the location using the wireless radio 204 to a wireless system. The provisioning device 116 can also keep a record of the location where the field device 202 is provisioned.

Although FIG. 2 illustrates additional details of an example field device 202 and an example provisioning device 116 in an industrial control and automation system 100, various changes may be made to FIG. 2. For example, the provisioning device 116 could communicate with the field device 202 using any other suitable communications. Also, any suitable type of provisioning device 116 could be used to provision any suitable type of field device 202.

Figure 3:
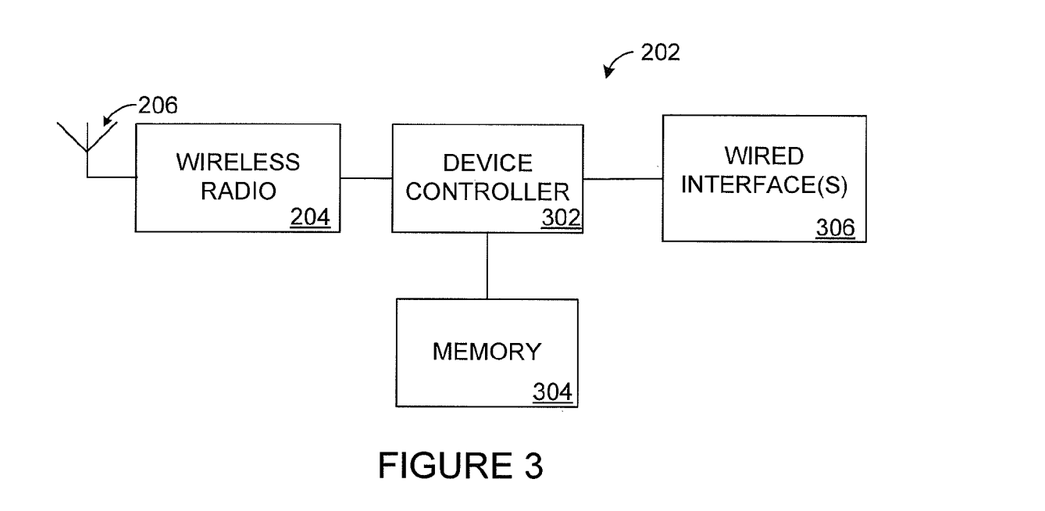
FIG. 3 illustrates an example field device in an industrial control and automation system according to this disclosure.

FIG. 3 illustrates an example field device 202 in an industrial control and automation system 100 according to this disclosure. As shown in FIG. 3, the field device 202 includes a device controller 302. The device controller 302 controls the overall operation of the field device 202. For example, the device controller 302 may receive or generate data to be transmitted externally, and the controller 302 could provide the data to one or more other components in the field device 202 for transmission over a wired or wireless network. The device controller 302 could also receive data over a wired or wireless network and use or pass on the data.

As particular examples, the controller 302 in a sensor leaf node could provide sensor data for transmission, and the controller 302 in an actuator leaf node could receive and implement control signals (note that a leaf node could represent a combined sensor-actuator device). As another example, the controller 302 in an infrastructure node could receive data transmitted wirelessly, determine a next hop for the data (if any), and provide the data for transmission to the next hop (if any). As a third example, the controller 302 in a gateway infrastructure node could receive data from a wired network and provide the data for wireless transmission (or vice versa). The controller 302 could perform any other or additional functions to support the operation of the field device 202.

The controller 302 includes any suitable structure for controlling the operation of the field device 202. As particular examples, the controller 302 could represent a processor, microprocessor, microcontroller, field programmable gate array (FPGA), or other processing or control device.

A memory 304 is coupled to the controller 302. The memory 304 stores any of a wide variety of information used, collected, or generated by the field device 202. For example, the memory 304 could be used to store the database 208, including the location of the field device 202 received from a provisioning device 116. The memory 304 includes any suitable volatile and/or non-volatile storage and retrieval device or devices.

If the field device 202 is a wireless device, the field device 202 can also include the wireless radio(s) 204 and antenna(s) 206 described above. The wireless radio(s) 204 and antenna(s) 206 can be used by the field device 202 to communicate wirelessly with other devices. For example, in a leaf node, the wireless radio(s) 204 and antenna(s) 206 can be used to communicate with infrastructure nodes. In an infrastructure node or gateway infrastructure node, the wireless radio(s) 204 and antenna(s) 206 can be used to communicate with leaf nodes, other infrastructure nodes or gateway infrastructure nodes, or WiFi or other devices (such as wireless controllers or hand-held user devices). Each wireless radio 204 may be coupled to its own antenna(s) 206, or multiple wireless radios 204 can share one or more common antennas 206. Each wireless radio 204 includes any suitable structure for generating signals to be transmitted wirelessly and/or receiving signals received wirelessly. In some embodiments, each wireless radio 204 includes an RF transceiver. Also, each antenna 206 could represent an RF antenna (although any other suitable wireless signals could be used to communicate).

If the field device 202 communicates using a wired connection (such as a gateway infrastructure node), the field device 202 may further include one or more wired interfaces 306. The wired interfaces 306 allow the field device 202 to communicate over one or more wired networks, such as the network 106. Each wired interface 306 includes any suitable structure for transmitting and/or receiving signals over a wired network, such as an Ethernet interface.

Note that the field device 202 can represent any component in the system 100 or other system, such as a process element 102 or controller 104. In general, the device controller 302 could be programmed to perform any desired functionality, and the memory 304 can be configured to store any desired information. Also, one of the wireless radio 204/antenna 206 or wired interface 306 could be omitted if only wired or wireless communications are desired.

Although FIG. 3 illustrates one example of a field device 202 in an industrial control and automation system 100, various changes may be made to FIG. 3. For example, various components in FIG. 3 could be combined, subdivided, or omitted and additional components could be added according to particular needs.

Figure 4:
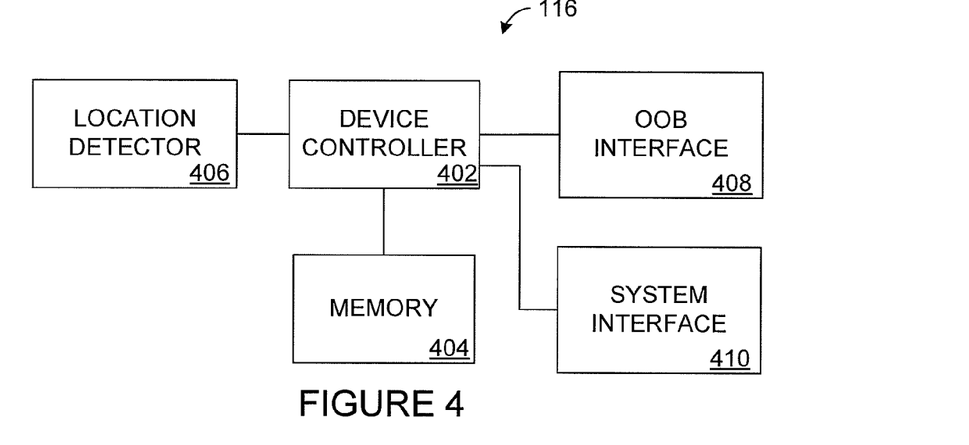
FIG. 4 illustrates an example provisioning device in an industrial control and automation system according to this disclosure.

FIG. 4 illustrates an example provisioning device 116 in an industrial control and automation system 100 according to this disclosure. As shown in FIG. 4, the provisioning device 116 includes a device controller 402. The device controller 402 controls the overall operation of the provisioning device 116. For example, the device controller 402 may receive input from a user indicating that a field device 202 is to be provisioned. The controller 202 could then provide any provisioning information (such as wireless security credentials) to the field device 202. The device controller 202 can also receive a location of the provisioning device 116 and provide that location to the field device 202. The device controller 402 can further provide information (like records of field devices and their associated positions) to one or more external devices or systems, such as the network manager 118 or provisioning database 120. In addition, the device controller 402 can receive a request for an identified location and provide the identified location in response to the request. The controller 402 includes any suitable structure for controlling the operation of the provisioning device 116. As particular examples, the controller 402 could represent a processor, microprocessor, microcontroller, FPGA, or other processing or control device.

A memory 404 is coupled to the controller 402. The memory 404 stores any of a wide variety of information used, collected, or generated by the provisioning device 116. For example, the memory 404 could be used to store the location of a field device 202 along with information identifying that field device 202. Any number of such records could be generated for any number of field devices. The memory 404 includes any suitable volatile and/or non-volatile storage and retrieval device or devices.

A location detector 406 identifies the location of the provisioning device 116. The location detector 406 can use any suitable technique to identify the location of the provisioning device 116. For example, the location detector 406 could represent a GPS receiver that detects location based on satellite signals. The location detector 406 could also represent an Ultra Wide Band (UWB) location sensor or other suitable structure that can accurately locate the position of the provisioning device 116. The location detector 406 includes any suitable structure for identifying the position of the provisioning device 116.

In this example, the provisioning device 116 further includes an out-of-band interface 408 that facilitates OOB communications with a field device 202. The out-of-band interface 408 includes any suitable structure for communicating with a field device out-of-band, such as a direct wired interface or an infrared interface.

In addition, the provisioning device 116 includes a system interface 410. The system interface 410 supports communications between the provisioning device 116 and an external device or system. As a particular example, the system interface 410 can be used to download updated wireless security credentials to the provisioning device 116 and to upload records of field device identifiers and locations to the network manager 118 or provisioning database 120. The system interface 410 includes any suitable structure supporting communications between the provisioning device 116 and an external device or system. The system interface 410 could, for instance, represent a wireless radio or a docking port.

Although FIG. 4 illustrates one example of a provisioning device 116 in an industrial control and automation system 100, various changes may be made to FIG. 4. For example, various components in FIG. 4 could be combined, subdivided, or omitted and additional components could be added according to particular needs.

Figure 5:
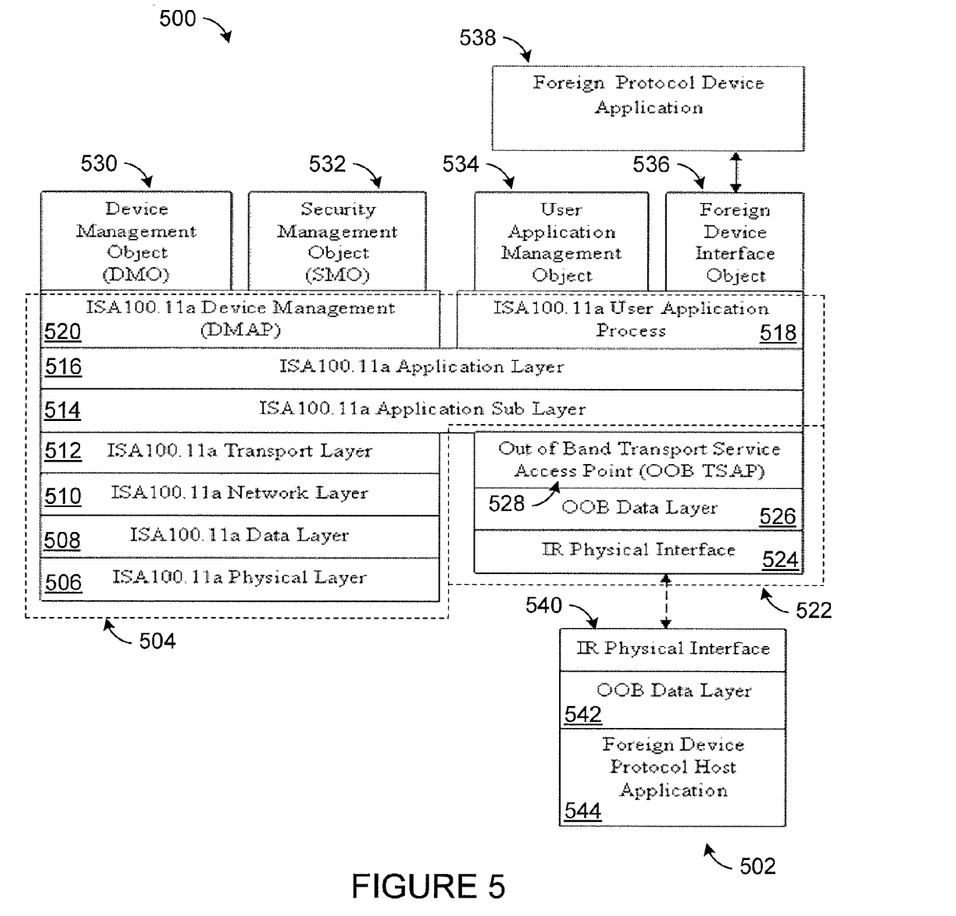
FIG. 5 illustrates example protocol stacks in a field device and a provisioning device in an industrial control and automation system according to this disclosure.

FIG. 5 illustrates example protocol stacks in a field device 202 and a provisioning device 116 in an industrial control and automation system 100 according to this disclosure. In particular, FIG. 5 illustrates example protocol stacks supporting the use of the ISA100.11a protocol and an infrared out-of-band interface. The protocol stacks can vary depending on the in-band and out-of-band communication mechanisms used.

As shown in FIG. 5, a protocol stack 500 is associated with the field device 202, and a protocol stack 502 is associated with the provisioning device 116. In this example, the protocol stack 500 includes various layers 504 supporting the ISA100.11a protocol. The layers 504 include a physical layer 506, a data layer 508, a network layer 510, and a transport layer 512 (which could support the standard OSI model functions). The layers 504 also include an application sub-layer 514, an application layer 516, and a user application process layer 518. The application sub-layer 514 provides a level of abstraction by making it unnecessary for higher layers to know what types of services are available at the transport level and the extent of services available at that level. The application layer 516 executes various applications that communicate with each other and with lower layers via the application sub-layer 514. The user application process layer 518 provides an additional layer for higher-level applications. The layers 504 further include a device management application process (DMAP) layer 520, which manages local communication aspects of the field device 202 and sets up connections for the layer 514.

The protocol stack 500 also includes various layers 522 supporting out-of-band communications. In this example, the layers 522 include an infrared physical interface layer 524 and an OOB data layer 526. The layer 524 supports the use of a physical infrared receiving device. The layers 522 also include an OOB transport service access point (TSAP) layer 528.

The protocol stack 500 further includes various objects for managing different aspects of the field device 202. For example, objects 530-534 are used to manage the field device 202, security for the field device 202, and user applications executed by the field device 202, respectively. Also, a foreign device interface object 536 facilitates use of a foreign protocol device application 538 in the field device 202. Here, the OOB communication interface to the application sub-layer 514 allows local access to both native objects and non-ISA100.11a protocol applications by use of the foreign device interface object 536. The OOB TSAP layer 528 provides packet notation to limit access as required by the field device 202 for local operations. In some embodiments, OOB packets do not contain network address fields and are inherently restricted by the OOB data layer 526 for local access.

The protocol stack 502 here includes an infrared physical layer 540, an OOB data layer 542, and a foreign device protocol host application 544. The host application 544 generally denotes an application that uses an OOB foreign protocol to communicate with the foreign protocol device application 538 in the field device 202. The host application 544 is thus able to provide provisioning information, as well as a determined location of the provisioning device 116, to the field device 202 during provisioning.

Although FIG. 5 illustrates examples of protocol stacks 500-502 in a field device 202 and a provisioning device 116 in an industrial control and automation system 100, various changes may be made to FIG. 5. For example, as noted above, the use of ISA100.11a and OOB infrared communications are examples only. Also, any other or additional layers could be used in the field device 202 and the provisioning device 116 to support provisioning of the field device 202.

Figure 6:
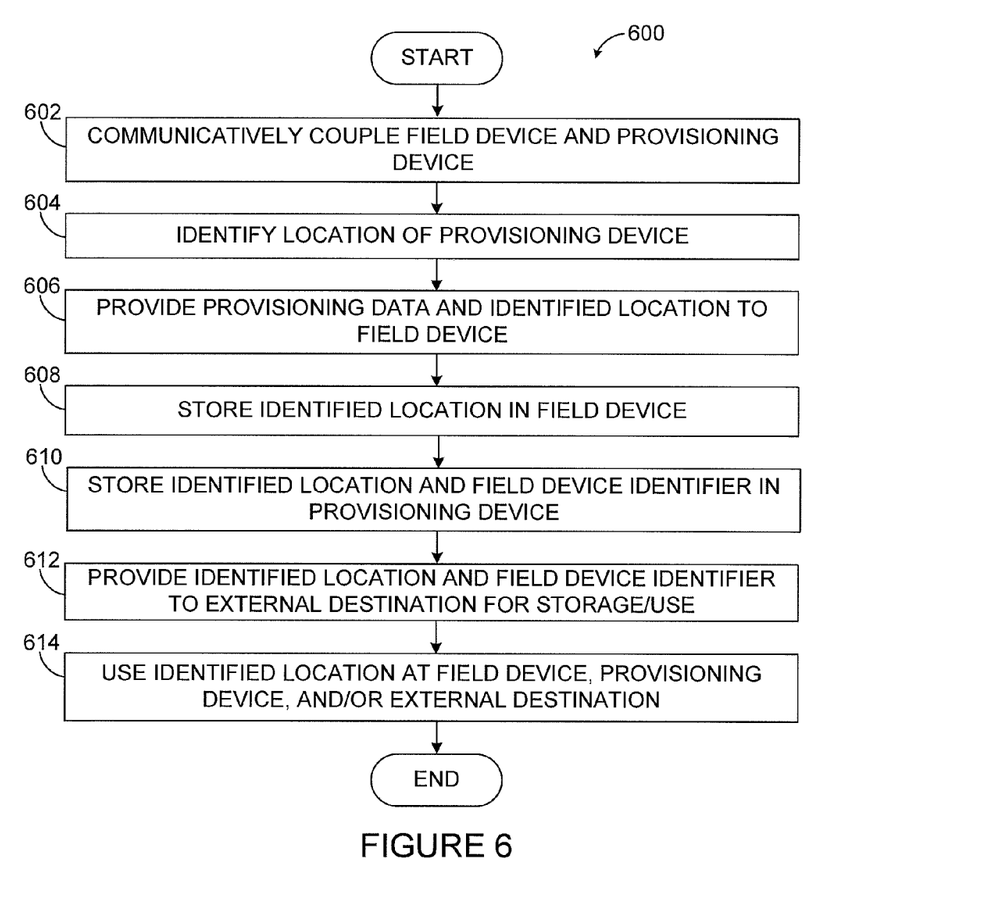
FIG. 6 illustrates an example method for wireless device location using automatic location update via a provisioning device according to this disclosure.

FIG. 6 illustrates an example method 600 for wireless device location using automatic location update via a provisioning device according to this disclosure. As shown in FIG. 6, a field device is communicatively coupled to a provisioning device at step 602. This could include, for example, physically coupling the provisioning device 116 to the field device 202 using a wired connection. This could also include initiating an infrared or other wireless communication session between the provisioning device 116 and the field device 202.

A location of the provisioning device is identified at step 604. This could include, for example, the location detector 406 in the provisioning device 116 identifying GPS or other geographical coordinates of the provisioning device 116. Since the provisioning device 116 is physically near the field device 202, the location of the provisioning device 116 can be treated as the location of the field device 202.

Provisioning data and the identified location are provided to the field device at step 606. This could include, for example, the provisioning device 116 communicating a wireless network identifier and wireless security credentials to the field device 202. As part of the provisioning, the provisioning device 116 also communicates the identified location to the field device 202. The field device stores the identified location at step 608. This could include, for example, storing the identified location in the database 208 of the field device 202, which can be maintained in a non-volatile memory 304. The field device 202 can treat the identified location as its own location.

The identified location and an identifier of the field device (or other field device-identifying information) are stored in the provisioning device at step 610. The identified location and field device identifier are also provided to an external destination at step 612. This could include, for example, the provisioning device 116 or the field device 202 communicating the identified location and field device identifier to the network manager 118, provisioning database 120, or other location(s).

The identified location can be used by the field device, the provisioning device, or external destination in any suitable manner at step 614. This could include, for example, the field device 202 providing the identified location as a location attribute in a message sent to an external device or system. The message could be sent in response to a request for the field device's location. This could also include the network manager 118 or provisioning database 120 providing the identified location in response to a request for the field device's location. Note that the identified location could be used by any suitable device(s) or system(s) and in any suitable manner(s).

Although FIG. 6 illustrates one example of a method 600 for wireless device location using automatic location update via a provisioning device, various changes may be made to FIG. 6. For example, while shown as a series of steps, various steps in FIG. 6 could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying a location of a provisioning device at the provisioning device;
   providing data from the provisioning device to a field device in an industrial control system, the field device configured to measure, adjust, or control one or more characteristics of an industrial process that processes one or more materials, wherein providing the data from the provisioning device to the field device provisions the field device so that the field device is able to communicate with other process control devices in the industrial control system;
   communicating the identified location to the field device for storage;
   storing the identified location in association with information identifying the field device at the provisioning device;
   communicating the identified location and the information identifying the field device from the provisioning device to an external destination;
   sending a request for the identified location to the external destination; and
   receiving the identified location from the external destination.

2. The method of claim 1, wherein the external destination comprises at least one of: a network manager and a provisioning database.

3. The method of claim 1, further comprising:
   sending a request for the identified location to the field device; and
   receiving from the field device the identified location as a location attribute of the field device.

4. The method of claim 1, wherein identifying the location of the provisioning device comprises identifying GPS coordinates of the provisioning device.

5. The method of claim 1, wherein providing the data and communicating the identified location to the field device comprise:
   communicating the data and the identified location to the field device through an out-of-band communication interface.

6. The method of claim 5, wherein the out-of-band communication interface comprises one of: a direct wired interface and an infrared interface.

7. An apparatus comprising:
   an interface configured to communicate with a field device that is configured to measure, adjust, or control one or more characteristics of an industrial process that processes one or more materials in an industrial control system;
   a location detector configured to identify a location of the apparatus;
   a controller configured to:
      initiate communication of data to the field device via the interface in order to provision the field device so that the field device is able to communicate with other process control devices in the industrial control system;
      initiate communication of the identified location to the field device via the interface;
      initiate communication of the identified location and information identifying the field device to an external destination; and
      provide the identified location in response to receiving a request for the identified location; and
   a memory configured to store the identified location in association with the information identifying the field device.

8. The apparatus of claim 7, wherein the external destination comprises at least one of: a network manager and a provisioning database.

9. The apparatus of claim 7, wherein the controller is further configured to receive the request for the identified location.

10. The apparatus of claim 7, wherein the location detector comprises a GPS receiver.

11. The apparatus of claim 7, wherein the interface comprises an out-of-band communication interface.

12. The apparatus of claim 11, wherein the out-of-band communication interface comprises one of: a direct wired interface and an infrared interface.

13. A system comprising:
   a field device in an industrial control system, the field device configured to measure, adjust, or control one or more characteristics of an industrial process that processes one or more materials; and a provisioning device configured to provision the field device, the provisioning device comprising:

an interface configured to communicate with the field device;

a location detector configured to identify a location of the provisioning device;

a controller configured to:

initiate communication of data to the field device via the interface in order to provision the field device so that the field device is able to communicate with other process control devices in the industrial control system;

initiate communication of the identified location to the field device via the interface; and initiate communication of the identified location and information identifying the field device to an external destination; and a memory configured to store the identified location in association with the information identifying the field device at the provisioning device;

wherein at least one component of the industrial control system is configured to request the identified location from the external destination and to receive the identified location from the external destination.

14. The system of claim 13, wherein:

the field device comprises a wireless field device;

the data comprises a wireless network identifier and wireless security credentials; and the field device is configured to use the wireless network identifier and the wireless security credentials to communicate with the other process control devices over a wireless network.

15. The system of claim 13, wherein the location detector comprises a GPS receiver.

16. The system of claim 13, wherein the interface comprises an out-of-band communication interface, the out-of-band communication interface comprising one of: a direct wired interface and an infrared interface.

17. The method of claim 1, wherein the request for the identified location is generated by at least one of the field device, the provisioning device, and the industrial control system.

18. The apparatus of claim 7, wherein the controller is further configured to receive the request for the identified location from at least one of: the field device, the apparatus, the industrial control system, and the external destination.

19. The system of claim 13, wherein the controller is further configured to:

receive a request for the identified location; and provide the identified location in response to the request.

20. The system of claim 13, wherein:

the field device comprises an ISA100.11a protocol stack and an out-of-band (OOB) communication protocol stack; and the provisioning device comprises an OOB communication protocol stack.

* * * * *